INVENTORS.
PETER LILLYS, MURRAY KAUFMAN,
ALAETTIN M. AKSOY AND
ROBERT C. GIBSON
By John R. Pegan
Attorney

INVENTORS.
PETER LILLYS, MURRAY KAUFMAN,
ALAETTIN M. AKSOY AND
ROBERT C. GIBSON
By
Attorney

INVENTORS.
PETER LILLYS, MURRAY KAUFMAN,
ALAETTIN M. AKSOY AND
ROBERT C. GIBSON
By
Attorney

United States Patent Office

3,243,287
Patented Mar. 29, 1966

3,243,287
HOT STRENGTH IRON BASE ALLOYS
Peter Lillys, Liverpool, N.Y., Murray Kaufman, West Peabody, Mass., and Alaettin M. Aksoy, Camillus, and Robert C. Gibson, Syracuse, N.Y., assignors of fifty percent to Crucible Steel Company of America, Pittsburgh, Pa., a corporation of New Jersey, and fifty percent to General Electric Company, New York, N.Y., a corporation of New York
Filed Sept. 14, 1962, Ser. No. 223,759
6 Claims. (Cl. 75—124)

This invention pertains to forgeable, high strength alloys for use at elevated temperatures and, more particularly, to low-cost iron base "superalloys" exhibiting enhanced strength properties at elevated temperatures up to about 1400° F.

Present day technology requires the use of materials of construction at increasingly high temperatures, in a variety of applications such as the missile and space fields, power generation, engine components for operation at high temperature, etc. As a result, there have been developed the so-called "superalloy" materials having relatively great strengths at the required high service temperatures. These materials, depending upon their specific compositions, may be used, for example, in the construction of gas turbine wheels and blades and other structural components exposed to relatively great stresses at elevated temperatures.

Currently, the superalloys generally comprise either iron, nickel or cobalt, or mixtures thereof, as the base element or elements. The nickel base superalloys are generally considered most useful at temperatures between 1200° to 1600° to 1700° F. and the iron base superalloys presently find their widest application at the lower end of this temperature range and somewhat below, for example, between about 1100° to 1200° F. Representative nickel base alloys for elevated temperature applications include: "M-252," containing about 55% nickel, 19% chromium, 10% cobalt, 10% molybdenum plus about 2% iron, 1% aluminum, and 2.5% titanium, and "Waspaloy" containing about 56% nickel, 19% chromium, 14% cobalt, 4.3% molybdenum, 3% titanium, 1.3% aluminum and 1% iron. Prior art iron base superalloys include alloys such as "V-57" containing about 25.5% nickel, 14.75% chromium, 1.25% molybdenum, 3% titanium, 0.25% aluminum and balance iron; "A-286" containing about 26% nickel, 15% chromium, 2% titanium, 0.25% aluminum and balance iron; and the nickel-chromium-iron alloy "901" containing about 40% nickel, 13% chromium, 6% molybdenum, 2.5% titanium, 0.25% aluminum, balance iron.

A distinct disadvantage of the nickel and cobalt base superalloys is their high cost as well as their high density and difficult workability.

Although prior art iron base superalloys are generally lower in cost than the nickel and cobalt base alloys, they cannot be used for the higher temperature applications, e.g., those over about 1200° F., because of the rapid loss of strength experienced at such elevated temperatures. Those iron base alloys containing appreciable quantities of elements such as tungsten, chromium, molybdenum, etc., are prone to assume a multiphase structure or extensive component segregation with a consequential tendency toward embrittlement and cracking or fracture either during working or during highly stressed operation of a fabricated part made therefrom. Additionally, the iron base superalloys of the prior art are generally more susceptible to corrosion than the nickel base superalloys at the elevated service temperature usually encountered. Despite such disadvantages, however, the iron base alloys do possess the distinct advantage of lower cost and lower density than the nickel and cobalt base superalloys.

Therefore, it is an object of the present invention to provide a low cost, readily forgeable alloy of high strength at elevated temperatures.

It is a further object to provide an improved iron base superalloy composition having both enhanced strength and corrosion resistance at elevated temperatures up to about 1400° F.

It is a still further object of the invention to provide an improved iron base superalloy exhibiting enhanced mechanical properties equivalent to those of more costly nickel base alloys and superior to those of prior art iron base superalloys.

It is yet another object of this invention to provide articles, such as gas turbine wheels, for high temperature, high stress applications, and having enhanced elevated temperature stress-rupture and tensile properties, together with improved oxidation resistance at elevated temperatures up to about 1400° F.

In accordance with the aforesaid objects, this invention provides a group of iron base superalloys within a broad composition range as follows:

| Element: | Weight percent |
|---|---|
| Carbon | max__ 0.1 |
| Nickel | 34 to 40 |
| Chromium | 12 to 15 |
| Molybdenum plus tungsten (wherein molybdenum is at least 2%) | 4.5 to 6.5 |
| Columbium plus tantalum | Up to 1.5 |
| Titanium | 2 to 3 |
| Aluminum | 1.0 to 3.5 |
| Boron | Up to 0.02 |
| Cobalt | Up to 7 |
| Iron | Balance |

Within the aforesaid broad composition range of the inventive alloys, we prefer a more limited range of compositions as follows:

| Element: | Weight percent |
|---|---|
| Carbon | max__ 0.08 |
| Nickel | 35 to 39 |
| Chromium | 12 to 14 |
| Molybdenum | 4.5 to 5.5 |
| Columbium plus tantalum | 0.5 to 1.5 |
| Titanium | 2.3 to 2.7 |
| Aluminum | 1.2 to 2.5 |
| Boron | 0.003 to 0.02 |
| Iron | Balance |

Within the compositional limits as aforesaid, we recognize an optimum composition range for the novel alloys of the invention as follows:

| Element: | Weight percent |
|---|---|
| Carbon | max__ 0.08 |
| Nickel | 36 to 38 |
| Chromium | 12 to 14 |
| Molybdenum | 4.5 to 5.5 |
| Columbium plus tantalum | 0.50 to 1.0 |
| Titanium | 2.3 to 2.7 |
| Aluminum | 1.2 to 2.0 |
| Boron | 0.003 to 0.015 |
| Iron | Balance |

A more complete understanding of the invention may be had by reference to the following description and appended drawings, wherein.

The compositions of a number of experimental alloys, prepared in the course of the development of this invention, are set forth in Table I hereinbelow.

Table I.—Chemical composition of experimental and certain prior art alloys, weight percent

| Alloy designation | C | Ni | Cr | Mo | Cb | Ta | Ti | Al | B | Co | Fe | Other |
|---|---|---|---|---|---|---|---|---|---|---|---|---|
| Experimental alloy No.:[1] | | | | | | | | | | | | |
| 1 | 0.058 | 36.00 | 17.90 | 5.02 | 0.86 | 0.08 | | 2.42 | 0.009 | | Bal | |
| 2 | 0.058 | 36.00 | 17.90 | 5.02 | 0.86 | 0.08 | | 3.40 | 0.009 | | | |
| 3 | 0.058 | 36.00 | 17.90 | 5.02 | 0.86 | 0.08 | | 4.20 | 0.009 | | | |
| 4 | 0.058 | 36.00 | 17.90 | 5.02 | 0.86 | 0.08 | | 5.04 | 0.009 | | | |
| 5 | 0.044 | 35.90 | 17.92 | 4.80 | 0.78 | 0.29 | 0.53 | 1.92 | 0.012 | | Bal | |
| 6 | 0.044 | 35.90 | 17.92 | 4.80 | 0.78 | 0.29 | | 2.92 | 0.012 | | | |
| 7 | 0.044 | 35.90 | 17.92 | 4.80 | 0.78 | 0.29 | | 3.84 | 0.012 | | | |
| 8 | 0.044 | 35.90 | 17.92 | 4.80 | 0.78 | 0.29 | | 4.56 | 0.012 | | | |
| 9 | 0.038 | 36.00 | 17.84 | 4.80 | 0.87 | 0.12 | 2.02 | 0.42 | 0.008 | | Bal | |
| 10 | 0.038 | 36.00 | 17.84 | 4.80 | 0.87 | 0.12 | | 1.49 | 0.008 | | | |
| 11 | 0.038 | 36.00 | 17.84 | 4.80 | 0.87 | 0.12 | | 2.69 | 0.008 | | | |
| 12 | 0.038 | 36.00 | 17.84 | 4.80 | 0.87 | 0.12 | | 3.82 | 0.008 | | | |
| 21 | 0.053 | 35.55 | 17.96 | 4.93 | 0.93 | 0.07 | 2.60 | 1.67 | 0.008 | | | |
| 25 | 0.059 | 36.65 | 10.16 | 4.99 | 0.80 | 0.17 | 2.40 | 1.49 | 0.007 | | Bal | |
| 27 | 0.059 | 36.65 | 13.12 | 4.99 | 0.80 | 0.17 | | | 0.007 | | | |
| 32 | 0.059 | 36.65 | 13.12 | 4.99 | 0.80 | 0.17 | 2.92 | 1.41 | 0.007 | | | |
| 33 | 0.012 | 35.85 | 12.86 | 4.99 | | | 2.66 | 1.47 | 0.010 | | Bal | |
| 34 | 0.012 | 35.85 | 12.86 | 4.99 | 0.39 | 0.04 | | | 0.010 | | | |
| 35 | 0.012 | 35.85 | 12.86 | 4.99 | 0.78 | 0.18 | | | 0.010 | | | |
| 36 | 0.044 | 36.00 | 13.00 | 4.99 | | | 2.52 | 1.41 | 0.009 | | Bal | |
| 37 | 0.044 | 36.00 | 13.00 | 4.99 | 0.79 | 0.054 | | | 0.009 | | | |
| 38 | 0.044 | 36.00 | 13.00 | 4.99 | 1.73 | 0.126 | | | 0.009 | | | |
| 40 | 0.086 | 36.05 | 13.14 | 4.99 | | | 0.99 | 2.51 | 1.39 | 0.009 | Bal | |
| 41 | 0.086 | 36.05 | 13.14 | 4.99 | | | 2.02 | | | 0.009 | | |
| 42 | 0.086 | 36.05 | 13.14 | 4.99 | | | 3.19 | | | 0.009 | | |
| 46 | 0.048 | 28.20 | 12.88 | 4.83 | 0.97 | 0.14 | 2.21 | 1.53 | 0.007 | 0.03 | Bal | |
| 47 | 0.048 | 28.10 | 12.78 | 4.83 | 0.97 | 0.14 | 2.23 | 1.53 | 0.005 | 6.84 | Bal | |
| 48 | 0.074 | 28.10 | 13.02 | 2.98 | 0.97 | 0.14 | 2.21 | 1.47 | 0.008 | | Bal | |
| 49 | 0.074 | 28.10 | 13.02 | 2.98 | 0.97 | 0.14 | 2.21 | 1.47 | 0.008 | | Bal | 3.04 W |
| 50 | 0.062 | 32.25 | 12.80 | 2.98 | 0.97 | 0.14 | 2.23 | 1.49 | 0.007 | | Bal | 3.09 W |
| 51 | 0.052 | 34.15 | 13.02 | 4.97 | | | 2.23 | 1.49 | 0.007 | | Bal | |
| 52 | 0.069 | 36.00 | 13.16 | 4.86 | 0.97 | | 2.26 | 1.55 | 0.011 | | Bal | |
| 55 | 0.042 | 36.85 | 13.04 | 4.86 | 0.92 | 0.08 | 2.56 | 2.42 | 0.009 | | Bal | |
| 56 | | | | | | | | 3.05 | | | | |
| 57 | | | | | | | | 3.26 | | | | |
| 58 | | | | | | | | 4.22 | | | | |
| CGW1 | 0.054 | 35.85 | 13.00 | 4.93 | 0.86 | 0.09 | 2.51 | 1.47 | 0.008 | | Bal | |
| HTHA | 0.053 | 35.10 | 12.98 | 4.96 | 0.95 | | 2.69 | 1.66 | 0.010 | | Bal | |
| HTLA | 0.046 | 35.50 | 12.86 | 4.99 | 0.92 | | 2.69 | 1.26 | 0.011 | | Bal | |
| LTHA | 0.061 | 37.05 | 12.98 | 4.99 | 0.95 | | 2.27 | 1.66 | 0.010 | | Bal | |
| LTLA | 0.054 | 37.30 | 12.84 | 4.93 | 0.91 | | 2.27 | 1.22 | 0.009 | | Bal | |
| 61–128 | 0.083 | 31.95 | 13.28 | 4.96 | 1.01 | | 2.66 | 1.82 | 0.008 | | Bal | |
| 61–129 | 0.058 | 34.10 | 13.04 | 4.91 | 0.96 | | 2.39 | 1.83 | 0.009 | | Bal | |
| 61–130 | 0.061 | 37.85 | 13.02 | 4.91 | 0.96 | | 2.43 | 1.83 | 0.009 | | Bal | |
| 61–131 | 0.060 | 39.40 | 12.76 | 4.91 | 0.96 | | 2.39 | 1.83 | 0.009 | | Bal | |
| 61–132 | 0.095 | 35.65 | 13.32 | 2.98 | 1.01 | | 2.48 | 1.92 | 0.009 | | Bal | |
| 61–133 | [2]0.093 | [2]35.67 | [2]13.30 | 3.94 | [2]1.01 | | [2]2.51 | [2]1.94 | [2]0.009 | | Bal | |
| 61–134 | [2]0.092 | [2]35.69 | [2]13.29 | 4.90 | [2]1.01 | | [2]2.54 | [2]1.95 | [2]0.009 | | Bal | |
| 61–135 | 0.091 | 35.70 | 13.28 | 5.34 | 1.01 | | 2.56 | 1.96 | 0.009 | | Bal | |
| 61–137 | 0.082 | 35.70 | 13.24 | 4.96 | 1.04 | | 2.49 | 2.17 | 0.009 | | Bal | |
| 61–138 | 0.076 | 35.70 | 13.18 | 4.83 | 1.07 | | 2.49 | 1.75 | 0.009 | | Bal | |
| 61–139 | 0.088 | 35.65 | 13.20 | 4.93 | 0.99 | | 2.53 | 2.42 | 0.008 | | Bal | |
| 62–3 | 0.072 | 35.50 | 13.20 | 5.64 | 1.01 | | 2.52 | 1.95 | 0.010 | | Bal | |
| Prior art alloys: | | | | | | | | | | | | |
| WF–11 (AMS–5759) | 0.15 | 10.0 | 20.0 | 2.6 | | | 1.0 | | | Bal | | 1.5 Mn 15.0 W 0.42 Si |
| M–252 | 0.15 | Bal. | 19.00 | 10.00 | | | 2.50 | 1.00 | 0.008 | 10.00 | | |
| Waspaloy | [3]0.08 | Bal. | 19.00 | 4.50 | | | 3.00 | 1.30 | 0.008 | 13.00 | | 0.05 Zr |
| V–57 | [3]0.08 | 25.00 | 15.00 | 1.00 | | | 3.00 | 0.25 | 0.008 | | Bal | |
| A–286 | [3]0.08 | 25.00 | 15.00 | 1.00 | | | 2.00 | [3]0.35 | 0.008 | | Bal | 0.30 V |
| Crucible 901 | [3]0.10 | 42.00 | 13.00 | 5.00 | | | 3.00 | [3]0.35 | 0.015 | | Bal | |
| M–308 | [3]0.08 | 32.00 | 14.00 | 4.00 | | | 2.00 | [3]0.45 | [3]0.01 | | Bal | 6.00 W 0.15 Zr |
| T–304 | [3]0.08 | 8/12 | 18/20 | | | | | | | | Bal | 2.0 Mn 0.045 max. P 0.03 max. S 1.0 max. Si |

[1] In addition to the elements appearing in Table I, the experimental alloys also contained about 0.05% or less of each of the elements Mn and Si. S and P levels were about 0.005%.
[2] Interpolated between values for Alloy Nos. 61–132 and 61–135. Each of Alloy Nos. 61–132 thru 61–135 comprised a split portion of a single heat and differences in amounts of all elements except Mo are due to dilution effect only.
[3] Maximum.

The elements nickel, chromium, molybdenum, columbium, titanium and aluminum are especially critical in these new alloys in order to obtain the aforesaid desired benefits. Thus, preliminary tests in the development of the new alloys indicate the function and importance of the presence of aluminum and titanium, in certain limited amounts of each. For example, stress-rupture tests which were conducted with Experimental Alloy Nos. 1–12 illustrate the variation in stress-rupture properties with varying amounts of aluminum and titanium in a substantially 18% chromium base composition. The results of such tests are set forth in Table II.

*Table II.—Stress-rupture properties of Experimental Alloys 1 to 12*[1]

| Alloy | Ti (percent) | Al (percent) | Stress-rupture properties at 1400° F. and 35,000 p.s.i. | | |
|---|---|---|---|---|---|
| | | | Life (hr.) | El. (percent) | R.A. (percent) |
| 1 | | 2.42 | 22.9 | 20 | 51 |
| 2 | | 3.40 | 22.5 | 9 | 29 |
| 3 | | 4.20 | 12.0 | 50 | 80 |
| 4 | | 5.04 | 0.6 | | |
| 5 | 0.53 | 1.92 | 190.6 | 12 | 39 |
| 6 | 0.53 | 2.92 | 129.7 | 13 | 34 |
| 7 | 0.53 | 3.84 | 92.0 | 26 | 37 |
| 8 | 0.53 | 4.56 | 70.4 | 21 | 42 |
| 9 | 2.02 | 0.42 | 319.3 | 7 | 22 |
| 10 | 2.02 | 1.49 | 634.6 | 14 | 33 |
| 11 | 2.02 | 2.69 | 262.8 | 12 | 23 |
| 12 | 2.02 | 3.82 | 65.2 | 28 | 42 |

[1] All alloys were solution treated at 1900° F. for 1 hour, air cooled, aged at 1400° F. for 16 hours, and air cooled.

The stress-rupture tests of Table II were performed, as were all other stress-rupture tests hereinafter set forth, in accordance with standard testing procedures of the American Society for Testing Materials (A.S.T.M.), i.e., A.S.T.M. Standards, E 150–59T. The test specimens of the Table II data were miniatures, 2 inches long, having a gauge section 1 inch in length and 0.160 inch in diameter. In all other stress-rupture tests, the specimens were 2½ inches long, having a gauge section one inch in length and ¼ inch in diameter.

From Table II it will be seen that by far the best stress-rupture life, with little decrease in ductility, is obtained in those compositions having a titanium content of about 2% and with an aluminum content between about 1 and 3%. Thus, Experimental Alloy No. 10, containing 2.02% titanium and 1.49% aluminum, showed a stress-rupture life of 634.6 hours at 1400° F. and at a stress of 35,000 p.s.i. Moreover, the ductility of this and similar alloys of Table II is maintained at a usefully high level. Thus, for example, Alloy No. 10 showed an elongation of 14% and the reduction in area for that alloy was 33%.

Although the data of Table II clearly show that the best stress-rupture properties are obtained, for the tested alloys, in a composition containing about 2% titanium and about 1 to 3% aluminum, it was further observed that the tested alloys contained relatively large amounts of sigma phase which had a harmful effect on the properties of the alloys. Consequently, further stress-rupture and tensile tests (conducted under the same conditions and with similar test specimens as aforesaid) were conducted with compositions wherein titanium was maintained at about 2 to 3%, aluminum was maintained between about 1.5 and 2% and wherein chromium was varied between about 10 and 18%. The results of such tests are given in Table III.

The tensile tests of Table III were performed, as were all other tensile tests hereinafter set forth, in accordance with standard A.S.T.M. testing procedures. Thus, the elevated temperature tensile tests were performed in accordance with A.S.T.M. Standards, E 151–59T, and the room temperature tensile tests were performed in accordance with A.S.T.M. Standards, E 8–54T. In all instances, the tensile test specimens were 3½ inches long, and a uniform strain rate was maintained at a value of 0.005 inch per inch per minute. It is evident from the data of Table III that restriction of the chromium content of the inventive alloys to a limited range is very important. Thus, in a base composition containing about 2.4% titanium and about 1.5% aluminum, it was found that the reduction of the chromium content to about 10 to 13% unexpectedly resulted in great improvement of stress-rupture life and, further, that at the intermediate chromium level of about 13%, best stress-rupture properties are obtained. Thus, reference to Table III shows that Experimental Alloy No. 27, having a chromium content of 13.12%, exhibited a stress-rupture life of 162.6 hours at 1400° F. and at a stress of 45,000 p.s.i.— a life much higher than that exhibited by Alloy No. 21 having a chromium content of 17.96% and, indeed, higher than the stress-rupture life of any of the substantially 18% chromium Alloy Nos. 1–12 of Table II. Further, Table III shows that the lower chromium steels possess quite useful ductility as measured by the stress-rupture tests and, still further, that both room temperature and 1400° F. tensile properties of the low chromium steels make these alloys exceptionally well suited for the intended applications. Thus, Alloy No. 27 exhibited an 0.2% offset yield strength of 122,000 p.s.i. at room temperature and maintained this property at a value of 103,000 p.s.i. at 1400° F. Similarly, the same alloy exhibited an ultimate tensile strength of 194,000 p.s.i. at room temperature and maintained this property at a value of 120,000 p.s.i. at 1400° F.

Little or no sigma phase was detected in the 13% chromium alloy (No. 27) of Table III when tested by the standard X-ray diffraction technique. However, as is evident from the data of Table III, although the 10% chromium steel exhibited tensile properties substantially equivalent to those of the 13% chromium steel, the stress-rupture properties of the former were substantially inferior to those of the latter. Appearance of the sigma phase has been found to be critically dependent upon the

*Table III.—Effect of chromium on the properties of experimental alloys containing 2.4% titanium and 1.5% aluminum* [1]

| Experimental alloy No. | Ti (percent) | Al (percent) | Cr (percent) | Stress-rupture properties at 1400° F. and 45,000 p.s.i. | | | Tensile properties | | | | |
|---|---|---|---|---|---|---|---|---|---|---|---|
| | | | | Life (hr.) | El. (percent) | R.A. (percent) | Test temp. (° F.) | 0.2% offset Y.S. (1,000 p.s.i.) | T.S. (1,000 p.s.i.) | El. (percent) | R.A. (percent) |
| 25 | 2.40 | 1.49 | 10.16 | 115.1 | 5.7 | 7.7 | R.T. | 122 | 205 | 19.6 | 37.4 |
| | | | | | | | 1,400 | 103 | 120 | 21.4 | 21.8 |
| 27 | 2.40 | 1.49 | 13.12 | 162.6 | 9.5 | 13.1 | R.T. | 122 | 194 | 23.2 | 34.0 |
| | | | | | | | 1,400 | 103 | 120 | 10.9 | 11.0 |
| 21 | 2.60 | 1.67 | 17.96 | [2] 10.0 | | | | | | | |

[1] All samples were solution treated at 1900° F. for 1 hour, air cooled, aged at 1400° F. for 16 hours, and air cooled.
[2] Extrapolated value from test conducted with stress of 35,000 p.s.i.

concentration of chromium and aluminum in the novel alloys and we have observed that small quantities of the sigma phase begin to appear in alloys, containing about 1.5% aluminum, at a chromium level of about 14%. Accordingly, a chromium content between about 12 and about 15%, preferably between about 12 and 14% is required in the novel steels.

Still further tests were conducted to determine the effect of aluminum and titanium in the 12–15% chromium steels, the results of such tests being given in Table IV.

*Table IV.—Effect of titanium on the stress-rupture properties of experimental alloys containing 13% Cr*

| Experimental alloy No. | Titanium | Aluminum | Stress-rupture life, hours at 1400° F., 55,000 p.s.i. |
| --- | --- | --- | --- |
| CG52 | 2.26 | 1.55 | 38 |
| LTHA | 2.27 | 1.66 | 34.4 |
| CG27 | 2.41 | 1.49 | 36 |
| CGW1 | 2.51 | 1.47 | 32 |
| HTHA | 2.69 | 1.66 | 36.9 |
| CG32 | 2.92 | 1.41 | 34 |

Figure 1:
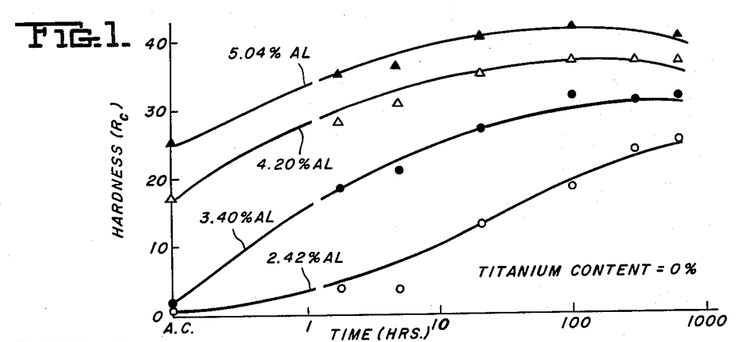
FIGS. 1 through 3 comprise graphs relating the effect of aluminum to the hardness of experimental alloys with and without titanium.
Figure 2:
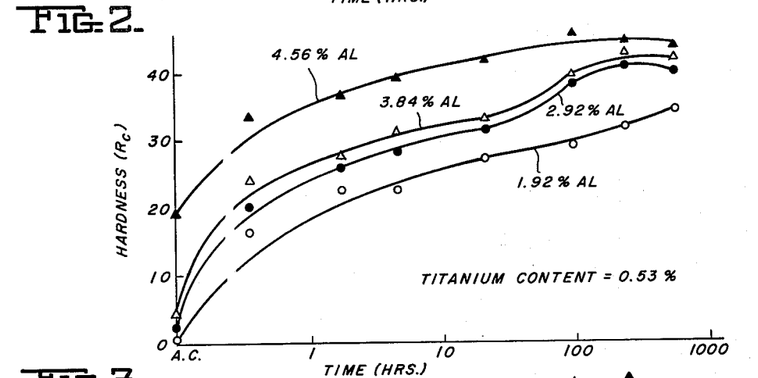
Figure 3:
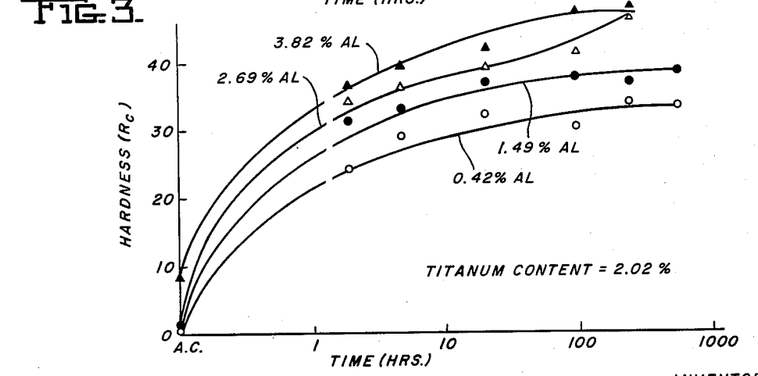

From the data of Table IV, it will be seen that, at an aluminum content of about 1.5% (1.49–1.66%), variation in the titanium content between about 2.3% to 2.9% has no significant effect upon the stress-rupture life as measured and given in Table IV, i.e., at 1400° F. and at a stress of 55,000 p.s.i. However, a minimum quantity of titanium is required, as is also a minimum quantity of aluminum, to obtain the desired properties, as proper hardening and stress-rupture strength. Reference again to Table II, above shows clearly that the test stress-rupture properties are not obtained with titanium as low as about 0.53% but that a titanium level of about 2% gives good results. The results of isothermal aging studies, conducted at 1400° F., on Experimental Alloy Nos. 1–12, after solution treatment at 1900° F., followed by air cooling, are presented in FIGS. 1–3 which relate Rc hardness with aging time in hours for these steels. Thus, FIG. 1 illustrates the effect of aluminum upon the hardness of the titanium-free Alloy Nos. 1–4, whereas FIG. 2 illustrates the effect of aluminum on the hardness of Alloy Nos. 5–8 containing 0.53% titanium and FIG. 3 illustrates the effect of aluminum on the hardness of Alloy Nos. 9–12 containing 2.02% titanium. Together, these three figures graphically illustrate the interaction between aluminum and titanium and the effect of these elements in the base compositions of Alloy Nos. 1–12.

From FIG. 1 it is apparent that, in a titanium-free base, there is required about 5% aluminum to reach a maximum hardness of Rc 40 after about 100 hours aging at 1400° F. From FIG. 2, it is evident that a hardness of Rc 40 is obtainable, under the same test conditions, with the use of only 3.8% aluminum when the same is present with about 0.53% titanium. FIG. 3 shows that it is possible to obtain a hardness of Rc 40 upon aging at 1400° F. in much less than 100 hours with an aluminum content of about 2.7% when accompanied by a titanium content of about 2%. Aluminum is itself a promoter of the detrimental sigma phase, and, in very high concentrations, tends to make the alloys quite brittle and difficult to forge. From FIGS. 1–3, it is evident that the addition of a minimum amount of titanium makes possible the use of lesser amounts of aluminum while retaining and, indeed, enhancing the hardening properties of the resultant alloys. Accordingly, about 2% minimum titanium is required in the novel steels.

Figure 4:
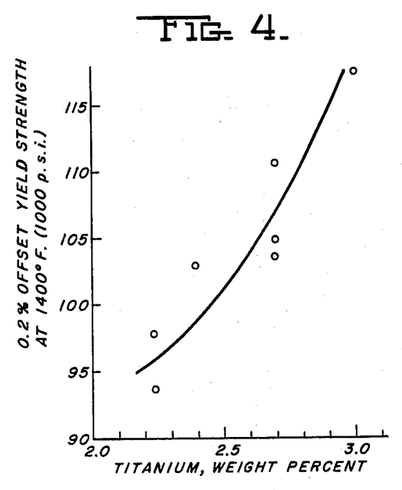
FIGS. 4 and 5 comprise graphs relating the effect of titanium to the elevated temperature tensile properties of experimental alloys.
Figure 5:
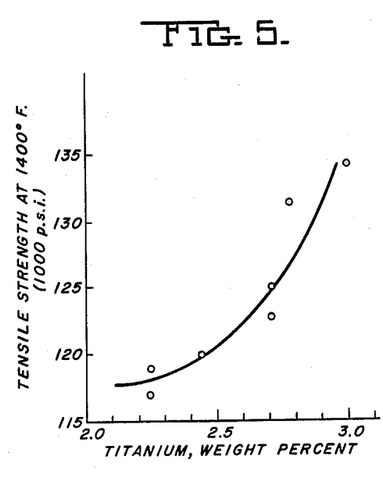

Titanium does, however, exert a marked influence upon the elevated temperature tensile properties of the contemplated alloys. This effect of titanium is graphically illustrated in FIGS. 4 and 5 from which it will be seen that both tensile strength and yield strength, as determined for Alloy Nos. LTHA, LTLA, HTLA, HTHA, 30, 31 and 27, at a test temperature of 1400° F., increase rapidly as titanium is increased over about 2 to 2.3%. However, titanium, if used in excessively large amounts, also tends to drastically reduce the hot workability of the steels and thereby increases their cost. For this reason, therefore, the upper limit of titanium is placed at about 3%. To gain for these new steels of balanced composition the full benefit of titanium in this regard, titanium is preferably restricted to between about 2.3 to 2.7%.

Aluminum is also extremely critical in these steels in respect to the stress-rupture properties thereof, as well as to the tensile properties at both room temperature and elevated temperatures. Thus, tensile properties and short time stress-rupture properties were determined for certain experimental alloys comprising a base composition of about 2.5% titanium wherein the aluminum content was varied between about 1.2 and 4%, as shown in Table V.

*Table V.—Effect of aluminum upon mechanical properties of 2.5% titanium experimental alloys*

| Alloy No. | Ti (percent) | Al (percent) | Stress-rupture properties at 1400° F. and 55,000 p.s.i. | | | Tensile properties | | | | |
| --- | --- | --- | --- | --- | --- | --- | --- | --- | --- | --- |
| | | | Life (hr.) | El. (percent) | R.A. (percent) | Test temp. (° F.) | 0.2% offset Y.S. (1,000 p.s.i.) | Ultimate T.S. (1,000 p.s.i.) | El. (percent) | R.A. (percent) |
| LTLA | 2.27 | 1.22 | 17.6 | 9.1 | 14.3 | 1,400 / R.T. / 1,400 | 94.5 / 119.5 / 99.0 | 116.5 / 195.0 / 123.0 | 19.5 / 21.4 / 16.4 | 24.3 / 35.4 / 21.8 |
| HTLA | 2.69 | 1.26 | 20.7 | 9.8 | 12.0 | R.T. / 1,400 | 129.5 / 111.5 | 202.0 / 123.0 | 18.0 / 20.6 | 26.7 / 25.8 |
| CGW1 | 2.51 | 1.47 | 30.6 | 9.1 | 15.1 | | | | | |
| 52 | 2.26 | 1.55 | 38.6 | 12.8 | 15.3 | | | | | |
| LTHA | 2.27 | 1.66 | 32.4 | 10.4 | 15.8 | 1,400 / R.T. / 1,400 | 99.0 / 122.0 / 104.0 | 119.3 / 195.0 / 125.0 | 18.6 / 20.6 / 18.3 | 27.6 / 35.4 / 24.6 |
| HTHA | 2.69 | 1.66 | 36.9 | 9.3 | 11.9 | | | | | |
| 61–138 | 2.49 | 1.75 | 50.4 | 4.8 | 11.4 | 1,400 | 109.0 | | | |
| 59 | 2.56 | 2.10 | 41.9 | 3.8 | 6.6 | R.T. / 1,400 | 128.5 / 112.0 | 199.0 / 130.0 | 20.3 / 16.0 | 32.8 / 36.1 |
| 61–137 | 2.49 | 2.17 | 64.0 | 8.6 | 11.9 | 1,400 | 107.0 | | | |
| 55 | 2.56 | 2.42 | 54.8 | 5.3 | 10.4 | R.T. / 1,400 | 123.0 / 108.5 | 194.0 / 128.0 | 22.1 / 9.7 | 30.7 / 15.3 |
| 61–139 | 2.53 | 2.42 | 48.0 | 6.7 | 8.7 | 1,400 | 106.0 | | | |
| 56 | 2.56 | 3.05 | 22.8 | 1.5 | 3.8 | | | | | |
| 57 | 2.56 | 3.26 | 19.7 | 2.9 | 3.3 | | | | | |
| 58 | 2.40 | 4.22 | 9.6 | 1.5 | 3.3 | | | | | |

Figure 6:
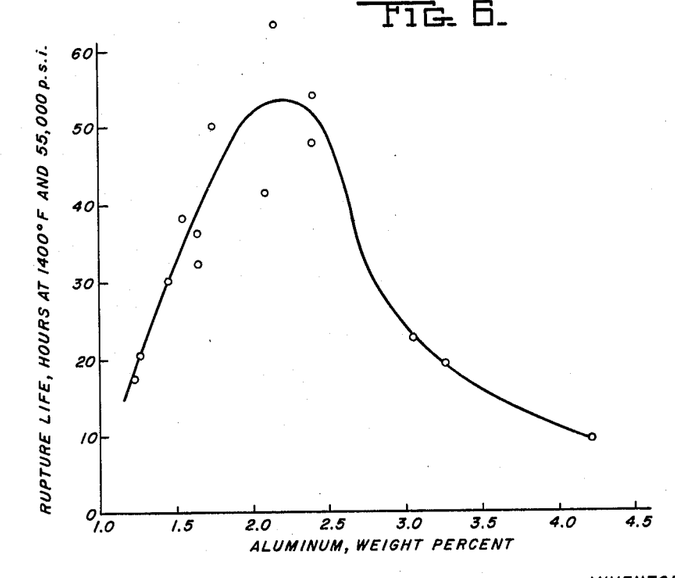
FIGS. 6 and 7 are graphs illustrating the effect of aluminum upon the stress-rupture life of the novel alloys.

All of the experimental alloys given in Table V, with the exception of alloys 56, 57 and 58 were solution treated at 1900° F. for two hours, air cooled, aged at 1400° F. for sixteen hours and air cooled. Alloys 56, 57 and 58 were given similar treatment but the solution treating temperature was 2000° F. The data of Table V is presented graphically in FIG. 6 which relates the aluminum content of the alloys of Table V with the observed stress-rupture life thereof. It will be noted from Table V and from FIG. 6 that aluminum has an extremely marked effect upon the elevated temperature stress-rupture properties of these alloys. Thus, from FIG. 6 it is clear that an aluminum content between about 1 and about 3.5% encompasses an extraordinary and unexpected rise in the stress-rupture life as measured at 1400° F. and at a stress of 55,000 p.s.i. and, further, that maximum short-term stress-rupture life is obtained with an aluminum content between about 1.5 and about 3.0%, specifically, about 1.75 to 2.5% aluminum.

Experimental alloys, having varying quantities of aluminum, were also tested to determine the effect of that element upon long-term stress-rupture properties, the results of such tests being given, in tabular form, in Table VI.

*Table VI.—Effect of aluminum upon long-time stress-rupture properties*

| Alloy No. | Percent Ti | Percent Al | Stress-rupture properties at 1400° F. and 40,000 p.s.i. | | |
|---|---|---|---|---|---|
| | | | Life, hr. | Percent elongation | Percent reduction of area |
| 61-138 | 2.49 | 1.75 | 353.7 | 4.0 | 5.5 |
| 61-138 | 2.49 | 1.75 | 427.3 | 4.8 | 14.1 |
| 61-138 | 2.49 | 1.75 | ¹390.5 | ¹4.4 | ¹).8 |
| 61-137 | 2.49 | 2.17 | 298.1 | 9.5 | 17.1 |
| 61-137 | 2.49 | 2.17 | 382.1 | 8.6 | 15.4 |
| 61-137 | 2.49 | 2.17 | ¹340.1 | ¹9.1 | ¹16.3 |
| 61-139 | 2.53 | 2.42 | 244.1 | 3.7 | 7.7 |
| 61-139 | 2.53 | 2.42 | 221.2 | 3.8 | 6.6 |
| 61-139 | 2.53 | 2.42 | ¹232.6 | ¹3.8 | ¹7.2 |

¹ Average.

Figure 7:
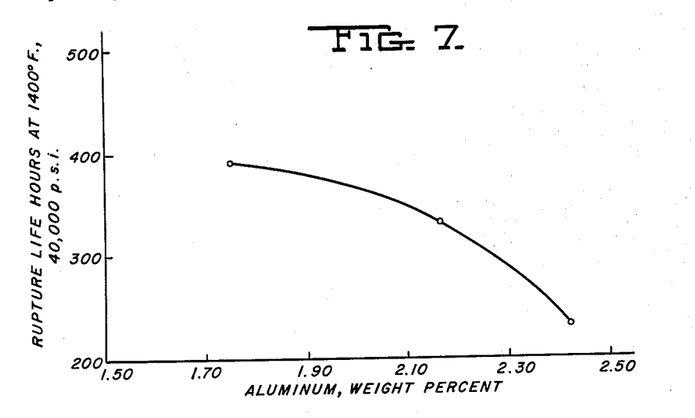

From the rupture-life data of Table VI, the averages of which are represented graphically in FIG. 7, it will be seen that the long-time life at elevated temperatures, e.g., 1400° F., decreases markedly at higher aluminum levels, e.g., over about 1.7 to 2.0%.

Accordingly, from the point of view of enhanced stress-rupture life, although an aluminum content between about 1.5 and 3.0% gives increased short-term improvement, a lower aluminum content, e.g., below about 1.75%, is necessary for best long-time stress-rupture life—a consideration of vital importance in the intended applications for the new alloys.

Aluminum is also critical in the new alloys in respect to enhancement of tensile properties. Thus, the Graphs A and B of FIG. 8, also erected upon the data of Table V, relate, respectively, the 0.2% offset yield strength and the ultimate tensile strength at 1400° F., with the percentage of aluminum in the tested alloys.

Figure 8:
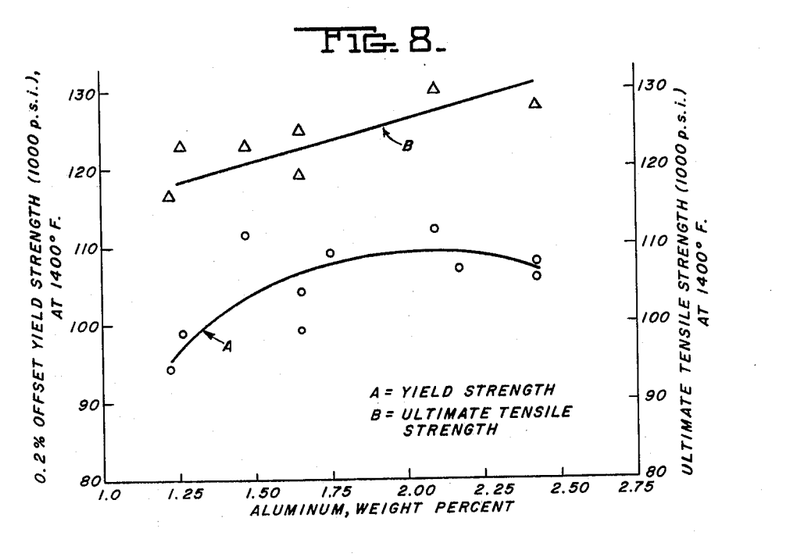
FIG. 8 is a graph illustrative of the effect of aluminum upon the tensile properties of the novel alloys.

It will be noted from FIG. 8 (Graph B thereof), that increasing the aluminum content over the range of about 1.25% to about 2.5% results in a marked increase in ultimate tensile strength. Moreover, Graph A of FIG. 8 shows that highest yield strength at 1400° F. is produced in the new alloys when aluminum is restricted to a range about 1.5% and 2.5%, the maximum of this property value being achieved with an aluminum level of about 1.75 to 2.25%.

Accordingly, in its broadest aspect, the invention contemplates the provision of aluminum in the range of from about 1% to 3.5%. Aluminum on the high side of this broad range is useful in conferring enhanced corrosion resistance upon the new steels. However, a more limited aluminum content is envisioned, within the broad range, but on the low side thereof, e.g., from about 1.2% to about 2.5% aluminum for the obtention of balanced mechanical properties, and a preferred range of aluminum of about 1.2% to about 1.75 or 2.0% is contemplated to obtain alloys having best long-time stress-rupture life, together with excellent tensile properties, in conjunction with good workability, substantially uniform microstructure and adequate corrosion resistance.

Columbium, in restricted amounts, is also a preferred element of the new steels, in order to obtain maximum stress-rupture properties, maximum tensile properties, and to enhance the corrosion resistance thereof. Table VII sets forth the results of tests of certain experimental alloys containing varying amounts of columbium or tantalum which latter element may be substituted, in large measure, for columbium, although columbium is preferred because of its lower cost and lesser density.

*Table VII.—Effect of columbium and tantalum on the mechanical properties of experimental alloys* [1]

| Alloy No. | Cb (percent) | Ta (percent) | Stress-rupture properties at 1400° F. and 55,000 p.s.i. | | | Tensile properties | | | | |
|---|---|---|---|---|---|---|---|---|---|---|
| | | | Life (hr.) | El. (percent) | R.A. (percent) | Test temp. (° F.) | 0.2% offset Y.S. (1,000 p.s.i.) | T.S. (1,000 p.s.i.) | El. (percent) | R.A. (percent) |
| 33 | | | ²30.4 | ²5.9 | ²6.5 | R.T. | 106 | 186.5 | 21.8 | 32.4 |
| | | | | | | 1,400 | 98 | 119 | 6.8 | 13.9 |
| 36 | | | 28.5 | 2.8 | 9.8 | 1,400 | 95.5 | 112.0 | 10.5 | 13.2 |
| 51 | | | ²15 | ²9.2 | ²11.4 | | | | | |
| 34 | 0.43 | | 29.1 | 1.9 | 6.6 | R.T. | 120 | 195.5 | 24.0 | 36.0 |
| | | | | | | 1,400 | 105 | 127 | 4.1 | 8.6 |
| 37 | 0.84 | | 29.8 | 3.7 | 7.7 | 1,400 | 105.5 | 120 | 14.4 | 21.9 |
| CGW1 | 0.86 | 0.09 | 32.1 | 9.0 | 14.0 | | | | | |
| 35 | 0.96 | | 30.2 | 1.0 | 2.2 | R.T. | 125 | 198 | 22.0 | 23.2 |
| | | | | | | 1,400 | 107.5 | 128 | 8.6 | 10.2 |
| 27 | 0.80 | 0.17 | 34.6 | 4.8 | 6.6 | | | | | |
| 38 | 1.86 | | ³14.0 | 1.0 | 1.1 | 1,400 | 103.5 | 127.5 | 25.7 | 40.4 |
| 40 | | 0.99 | 32.4 | 14.2 | 17.1 | 1,400 | 102 | 115.5 | 16.0 | 21.9 |
| 41 | | 2.02 | 8.4 | 12.3 | 16.1 | 1,400 | 106 | 124 | 16.8 | 19.6 |
| 42 | | 3.19 | ⁴20.0 | 1.9 | 2.2 | 1,400 | 104.5 | 128 | 22.9 | 35.7 |

¹ All alloys were solution treated at 1900° F. for 1 hour, air cooled, aged at 1400° F. for 16 hours, and air cooled.
² Average of two tests.
³ Extrapolated from a life of 61.2 hours at a stress of 45,000 p.s.i.
⁴ Extrapolated from a life of 105.8 hours at a stress of 45,000 p.s.i.

Figure 9:
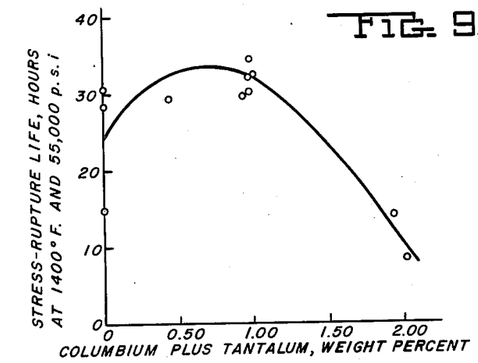
FIG. 9 is a graph showing the effect of columbium plus tantalum upon stress-rupture life of the novel alloys.
Figure 10:
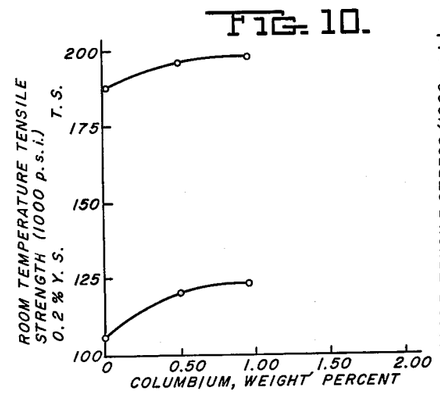
FIGS. 10 and 11 are graphs relating the effect of columbium upon room temperature and elevated temperature tensile properties of the alloys of the invention.
Figure 11:
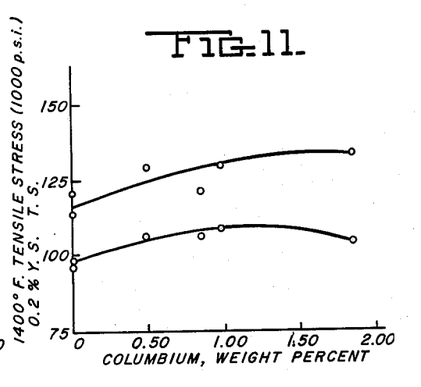

The data of Table VII is graphically represented in FIGS. 9, 10 and 11 illustrating the relationship between columbium (plus tantalum) and, respectively, stress-rupture life, room temperature tensile properties and elevated temperature tensile properties. From FIG. 9, it will be seen that maximum stress-rupture life at 1400° F. is obtained in the alloys of the invention with a columbium content between about 0.4% and about 1.5% and that stress-rupture life rapidly decreases at columbium levels over about 1%, reaching quite low values at columbium levels over about 1.5%. Although there is a slight rise in stress-rupture life when as much as 3% tantalum is added (Alloy No. 42, Table VII), the ductility thereof is greatly reduced. Additionally, microscopic examination of the fractured stress-rupture specimens of Table VI revealed that the alloys containing as much as 2 or 3% columbium or tantalum contained large quantities of a Laves phase, apparently $(FeCr)_2$ (Cb,Ta), which had a harmful effect on stress-rupture properties. Similarly, FIGS. 10 and 11 show that the maximum yield strength, at both room temperature and at 1400° F., is reached at a columbium content of about 0.40 to 0.75% and that yield strength is not further improved by the addition of columbium in amounts above about 1.25% or 1.5%. Further, FIGS. 10 and 11 indicate that tensile strength increases with columbium content up to about 1.25 or 1.50% but is not materially increased with the use of larger amounts.

Figure 12:
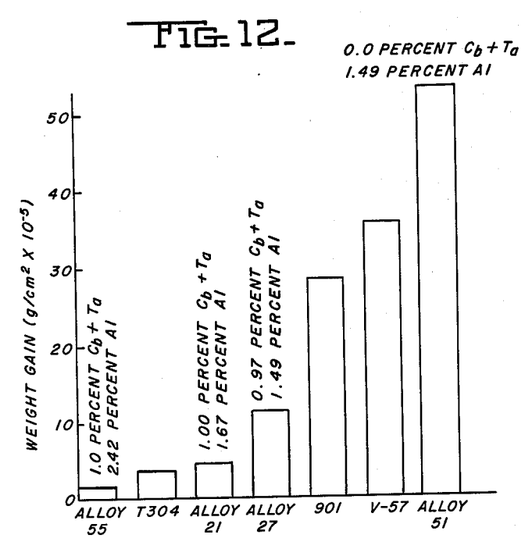
FIG. 12 is a diagram illustrative of the effects of columbium plus tantalum, and of aluminum, upon the elevated temperature oxidation resistance of the steels of the invention and upon certain prior art, high temperature iron base alloys.

Further, columbium, in about the same critical amount as required for obtaining best mechanical properties, is also effective to enhance the elevated temperature corrosion resistance of the novel steels. Thus, FIG. 12 sets forth the results of elevated temperature oxidation tests of a number of experimental and prior art compositions. In these tests all specimens were machined to rounds having a diameter of 0.375 inch and a length of 0.6 inch. The specimens were polished to a 3/0 finish, cleaned and weighed. The specimens were then exposed for 100 hours, at 1400° F., in air, following which the specimens were again weighed to determine the weight gain. The results of these tests are graphically represented in FIG. 12, from which it will be seen that the addition of columbium resulted in a very marked reduction in the weight gain of the test specimens, i.e., a marked improvement in resistance to oxidation. Thus, Experimental Alloy No. 51, containing no columbium or tantalum, showed a weight gain of about $53 \times 10^{-5}$ gms./cm.$^2$—decidedly inferior to prior art alloys "901" and "V-57" which exhibited, respectively, about $28 \times 10^{-5}$ gms./cm.$^2$ and $36 \times 10^{-5}$ gms./cm.$^2$ weight gain. On the other hand, the addition of 0.97% columbium plus tantalum to Experimental Alloy No. 27 reduced the weight gain thereof to the relatively much lower value of about $11.5 \times 10^{-5}$ gms./cm.$^2$, and the further addition of columbium and tantalum to an amount of 1.0%, in the case of Experimental Alloy Nos. 21 and 55, still further reduced the weight gain to $4.5 \times 10^{-5}$ gms./cm.$^2$ and about $2 \times 10^{-5}$ gms./cm.$^2$, respectively. The oxidation resistance of Alloy 55, containing 2.42% aluminum, is superior to that of Type 304 stainless steel, containing approximately 18% chromium and 8% nickel.

Accordingly, columbium is provided in the new steels in a broad range up to about 1.5%, and in a more limited, preferred range of from about 0.40 to 1.25%.

In addition to high temperature oxidation resistance, the inventive alloys also exhibit pronounced corrosion resistance. Thus, a number of samples of the Alloy CGW1 composition were subjected to a standard A.S.T.M. salt spray corrosion test (A.S.T.M. Standards, 1958, Part 3, Designation B 117–57T) for a test period of one month. No pitting corrosion was observable.

Nickel is also an essential element in the alloys of the invention and is required in certain restricted quantities, as shown by the results of the further tests appearing in Table VIII.

*Table VIII.—Effect of nickel upon mechanical properties*

| Alloy No. | Variable element, weight percent | | | Stress-rupture properties at 1400° F. and 55,000 p.s.i. | | | | Tensile properties | | | | |
|---|---|---|---|---|---|---|---|---|---|---|---|---|
| | Ni | Co | W | Soln. temp. (° F.) | Life (hrs.) | El. (percent) | R.A. (percent) | Test temp. (° F.) | 0.2 offset yield strength (1,000 p.s.i.) | Ultimate tensile strength (1,000 p.s.i.) | El. (percent) | R.A. (percent) |
| 46 | 28.20 | | | 2,000 | 7.8 | 6.8 | 8.7 | | | | | |
| 47 | 28.10 | 6.84 | | 1,950 | 12.4 | 6.7 | 9.8 | | | | | |
| 47 | 28.10 | 6.84 | | 2,000 | 13.3 | 5.8 | 8.7 | | | | | |
| 48 | 28.10 | | | 1,900 | 3.6 | 7.8 | 13.0 | | | | | |
| 48 | 28.10 | | | 1,950 | 3.9 | 8.7 | 10.9 | | | | | |
| 49 | 28.10 | | 3.04 | 2,000 | 15.1 | 4.9 | 9.8 | | | | | |
| 61-128 | 31.95 | | | 1,900 | 21.4 | 12.3 | 24.2 | R.T. | 125.5 | 198.0 | 16.3 | 24.5 |
| 61-128 | 31.95 | | | 1,900 | 14.8 | 12.5 | 27.7 | 1,400 | 94.0 | 116.5 | 25.7 | 37.9 |
| 50 | 32.25 | | 3.09 | 2,000 | 23.5 | 2.9 | 9.8 | | | | | |
| 61-129 | 34.10 | | | 1,900 | 37.1 | 6.6 | 10.8 | R.T. | 117.5 | 189.0 | 19.2 | 37.3 |
| 61-129 | 34.10 | | | 1,900 | 38.8 | 5.8 | 9.8 | 1,400 | 102.0 | 118.5 | 16.8 | 30.8 |
| 61-129 | 34.10 | | | 1,900 | ¹ 243.8 | ¹ 6.5 | ¹ 12.0 | | | | | |
| 52 | 36.00 | | | 1,900 | 38.6 | 9.4 | 15.8 | | | | | |
| 61-130 | 37.85 | | | 1,900 | 57.3 | 7.5 | 14.0 | R.T. | 122.0 | 192.5 | 18.3 | 32.1 |
| 61-130 | 37.85 | | | 1,900 | 49.4 | 6.7 | 15.0 | 1,400 | 110.6 | 128.8 | 12.0 | 18.3 |
| 61-130 | 37.85 | | | 1,900 | ¹ 401.2 | ¹ 5.6 | ¹ 14.0 | | | | | |
| 61-131 | 39.30 | | | 1,900 | 57.3 | 6.8 | 7.6 | R.T. | 124.0 | 193.5 | 18.6 | 33.4 |
| 61-131 | 39.30 | | | 1,900 | 45.3 | 5.8 | 8.7 | 1,400 | 108.5 | 127.5 | 16.2 | 19.0 |
| 61-131 | 39.30 | | | 1,900 | ¹ 267.2 | ¹ 4.7 | ¹ 8.8 | | | | | |

¹ Tested at 1400° F. and 40,000 p.s.i.

All of the alloy specimens of Table VIII were solution treated for two hours at the indicated temperature, aged for sixteen hours at 1400° F. and air cooled. All specimens were of the standard form heretofore described.

Figure 13:
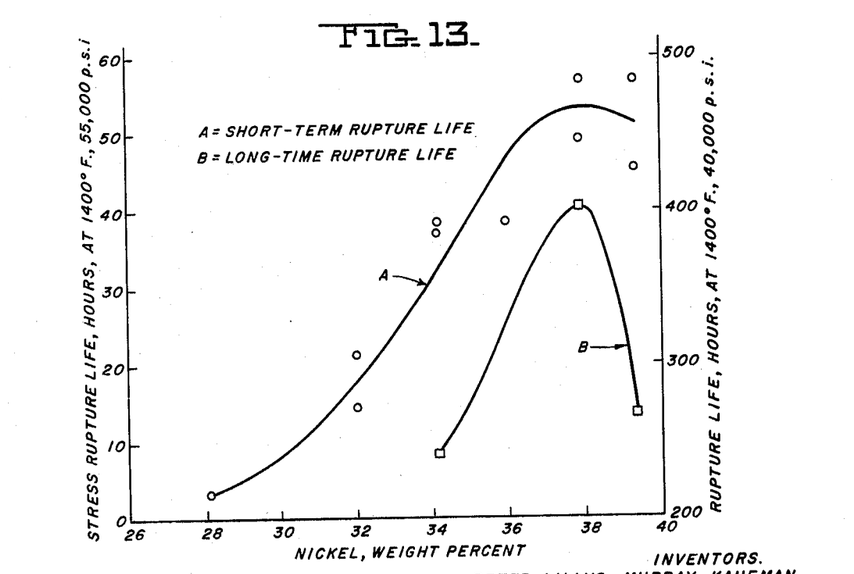
FIG. 13 is a set of graphs illustrating the effect of nickel upon stress-rupture life of experimental alloys.

Graph A of FIG. 13 is constructed from the short-term, i.e., 55,000 stress level, data of Table VIII, whereas Graph B of that figure is erected upon the long-term, i.e., 40,000 p.s.i. stress level, data of Table VIII. These graphs illustrate the marked and critical effect of a restricted amount of nickel in the alloys of the invention. Thus, from these graphs, it is seen that, in order to obtain enhanced rupture life, a minimum nickel content of about 34%, preferably about 36%, is required and, further, and quite importantly, an upper limit of permissible nickel content must be maintained at about 39 to 40%, and preferably about 38% in order to achieve highest long-time stress-rupture life. Nickel limits for optimally balanced stress-rupture properties, and low cost, are therefore set between about 36 and 38%.

It will be further noted, from the data of Table VIII, that there is no substantial effect of increasing nickel, throughout the range tested, upon the room temperature tensile properties of the test alloys, although maximum yield and ultimate tensile strengths, at 1400° F., are obtained with a nickel content of about 38%.

It will also be noted from Table VIII that the addition of about 7% cobalt, i.e., in Experimental Alloy No. 47, had very little effect upon the stress-rupture properties of the alloy which contained about 28% nickel. Accordingly, although cobalt is not an essential element of the new steels, it may be included in amounts up to about 7%, but is not preferred due to the added cost thereof.

Molybdenum, in certain, limited amounts, is also an essential element in the inventive alloys, as shown by the results of tests appearing in Table IX.

Table IX.—Effect of molybdenum upon mechanical properties [1]

| Alloy No. | Mo, wt. percent | Stress-rupture properties at 1400° F. and 55,000 p.s.i. | | | Tensile Properties | | | | |
|---|---|---|---|---|---|---|---|---|---|
| | | Life (hrs.) | El. (percent) | R.A. (percent) | Test temp. (° F.) | 0.2% offset yield strength (1,000 p.s.i.) | Ultimate tensile strength (1,000 p.s.i.) | El. (percent) | R.A. (percent) |
| 61-132 | 2.98 | 18.8 | 9.5 | 10.9 | R.T. | 119.0 | 192.0 | 19.4 | 33.4 |
| 61-132 | 2.98 | 17.9 | 6.8 | 9.8 | 1,400 | 96.0 | 117.0 | 13.6 | 17.5 |
| 61-133 | 3.94 | 26.8 | 9.7 | 10.9 | R.T. | 123.0 | 195.0 | 15.0 | 26.2 |
| 61-133 | 3.94 | 22.1 | 6.8 | 11.9 | 1,400 | 98.0 | 120.0 | 17.0 | 22.6 |
| 61-134 | 4.90 | 29.5 | 9.7 | 10.9 | R.T. | 120.0 | 192.0 | 20.5 | 30.8 |
| 61-134 | 4.90 | 30.3 | 8.7 | 11.9 | 1,400 | 101.0 | 123.0 | 15.6 | 28.7 |
| 61-135 | 5.34 | 42.1 | 14.4 | 15.0 | R.T. | 120.5 | 191.0 | 18.1 | 34.1 |
| 61-135 | 5.34 | 36.8 | 8.7 | 12.9 | 1,400 | 101.5 | 122.0 | 20.2 | 32.2 |
| 62-3 | 5.64 | 42.7 | 13.2 | 21.2 | R.T. | 130.0 | 185.0 | 16.3 | 25.7 |
| 62-3 | 5.64 | | | | 1,400 | 107.0 | 127.0 | 10.5 | 19.7 |

[1] All samples were solution treated at 1900° F. for 2 hours, air cooled, aged 16 hours at 1400° F. and air cooled.

Figure 14:
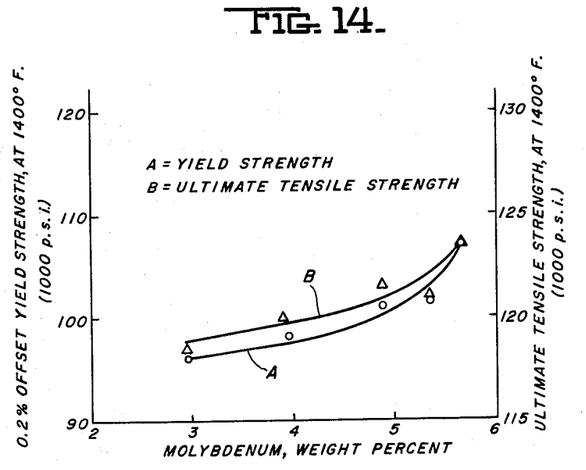
FIG. 14 is a set of graphs illustrating the effect of molybdenum upon tensile properties of experimental alloys.
Figure 15:
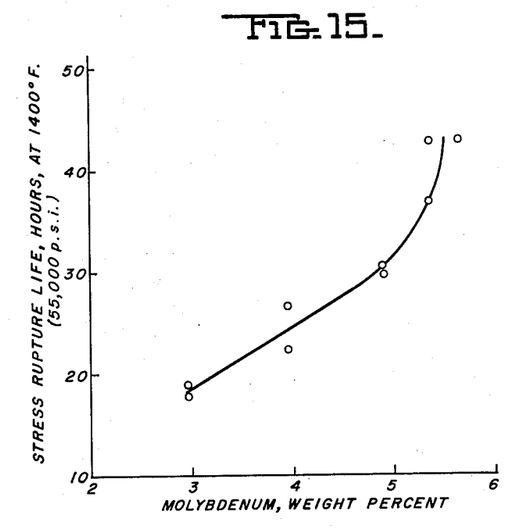
FIG. 15 is a graph illustrative of the effect of molybdenum upon stress-rupture properties of experimental alloys.

Graphs A and B of FIG. 14, erected upon the data of Table IX, illustrate the effect of varying molybdenum contents upon, respectively, the yield strength and the ultimate tensile strengths, at 1400° F., of the experimental alloys, show that, at a molybdenum content of about 4.5 to 5.0%, these elevated temperature tensile properties begin a rapid increase throughout the remainder of the range tested. Similarly, as will seen from FIG. 15, at about 4.5 to 5.0% molybdenum, the 1400° F. stress-rupture life undergoes a marked increase. Accordingly, molybdenum is required in the steels of the invention at a minimum level of about 4.5%. A maximum of about 6.5%, preferably about 5.5% molybdenum is placed upon the molybdenum content of the new steels inasmuch as higher molybdenum contents result in substantially increased cost of the steels and increased difficulty in workability. Moreover, comparison of FIG. 15 with Graph A of FIG. 13 shows that the highest rupture life properties achieved by the use of larger quantities of molybdenum can be obtained and, indeed, exceeded more economically by the use of nickel on the high side of the contemplated range of that element.

It will be further noted from the data of Table VIII that tungsten may be utilized as a partial replacement for molybdenum in the alloys of the invention. Thus Experimental Alloy No. 49, containing 3.04% tungsten in addition to 2.98% molybdenum, exhibited somewhat better stress-rupture properties than Experimental Alloy Nos. 46, containing 4.83% molybdenum, and 48, containing 2.98% molybdenum. Thus, in its broadest aspects, the invention contemplates the partial replacement of molybdenum with the element tungsten, but it is preferred that at least 2 or 3% molybdenum appear in the alloy composition, and, with this restriction, the total molybdenum plus tungsten content is held in the range of about 4.5 to 6.5%. However, the use of tungsten as a partial replacement for molybdenum in the new alloys is not preferred since the additional property improvements by reason of the use of tungsten are not sufficient to offset the disadvantages of tungsten, i.e., its high cost and high density.

The hardening properties of the new alloys are further enhanced by the incorporation therein of limited amounts of boron and that element may, therefore, be added in amounts up to about 0.015 or 0.02% and is preferably included in an amount of from about 0.003 up to the aforesaid maximum quantity.

The results of still further stress-rupture and tensile tests, conducted under the aforesaid standard conditions and with standard test specimens as above-described, are given in Table X for a number of representative alloys of the invention.

Table X.—Mechanical properties of representative alloys of the invention [1]

| Alloy | Stress-rupture properties | | | | | Tensile properties | | | | |
|---|---|---|---|---|---|---|---|---|---|---|
| | Test temp. (° F.) | Stress (1,000 p.s.i.) | Life (hr.) | El. (percent) | R.A. (percent) | Test temp. (° F.) | 0.2% offset Y.S. (1,000 p.s.i.) | T.S. (1,000 p.s.i.) | El. (percent) | R.A. (percent) |
| LTLA | 1,400 | 55 | 17.8 | 10.7 | 15.0 | 1,400 | 94.0 | 116.5 | 18.3 | 21.8 |
| | | | 17.3 | 10.0 | 9.8 | | 95.0 | 116.5 | 20.8 | 26.7 |
| | | | 17.7 | 6.8 | 18.3 | | | | | |
| | 1,300 | 75 | 20.7 | 7.7 | 10.9 | 1,300 | 115.0 | 142.0 | 17.0 | 24.6 |
| | | | 21.8 | 7.7 | 10.9 | | 115.0 | 142.0 | 17.0 | 24.0 |
| | 1,200 | 95 | 102.5 | 4.9 | 7.7 | 1,200 | 123.0 | 159.5 | 23.8 | 40.1 |
| | 1,100 | 110 | 185.0 | 2.9 | 6.6 | 1,100 | 114.0 | 167.5 | 20.0 | 45.2 |
| | | | 225.1 | 4.9 | 7.7 | | | | | |
| | | | | | | 1,000 | 111.0 | 169.0 | 20.0 | 44.0 |
| | | | | | | R.T. | 112.5 | 188.5 | 21.2 | 39.1 |
| | | | | | | | 112.5 | 188.0 | 22.4 | 37.9 |
| LTHA | 1,400 | 55 | 30.6 | 9.8 | 14.1 | 1,400 | 99.0 | 119.5 | 19.8 | 29.0 |
| | | | 34.4 | 10.6 | 16.1 | | 99.0 | 119.0 | 17.4 | 26.1 |
| | | | 32.2 | 10.7 | 17.1 | | | | | |
| | 1,300 | 75 | 62.1 | 9.6 | 14.3 | 1,300 | 120.0 | 144.0 | 17.6 | 26.1 |
| | | | | | | | 117.0 | 143.0 | 29.0 | 22.8 |
| | 1,200 | 95 | 81.5 | 3.9 | 7.9 | 1,200 | 125.0 | 162.0 | 23.1 | 41.3 |
| | | | 81.9 | 3.9 | 8.7 | | | | | |
| | 1,100 | 110 | 300.6 | 1.9 | 3.9 | 1,100 | 116.0 | 169.0 | 20.8 | 44.6 |
| | | | 379.6 | 2.9 | 5.5 | | | | | |
| | | | | | | 1,000 | 114.0 | 170.0 | 18.5 | 37.3 |
| | | | | | | R.T. | 115.0 | 188.0 | 22.9 | 37.9 |
| | | | | | | | 115.0 | 186.0 | 23.1 | 37.3 |

[1] All alloys were solution treated at 1900° F. for 2 hours, air cooled, aged at 1400° F. for 16 hours, and air cooled.

*Table X—Continued*

| Alloy | Stress-rupture properties | | | | | Tensile properties | | | | |
|---|---|---|---|---|---|---|---|---|---|---|
| | Test temp. (°F.) | Stress (1,000 p.s.i.) | Life (hr.) | El. (percent) | R.A. (percent) | Test temp. (°F.) | 0.2% offset Y.S. (1,000 p.s.i.) | T.S. (1,000 p.s.i.) | El. (percent) | R.A. (percent) |
| HTLA | 1,400 | 55 | 20.7 | 9.8 | 12.0 | 1,400 | 99.0 | 123.0 | 16.4 | 21.8 |
|  |  |  | 19.0 | 5.8 | 9.8 |  | 97.5 | 122.0 | 17.0 | 23.2 |
|  |  |  | 19.0 | 6.0 | 9.8 |  |  |  |  |  |
|  | 1,300 | 75 | 26.9 | 4.9 | 8.8 | 1,300 | 121.0 | 148.0 | 17.8 | 26.1 |
|  |  |  | 26.8 | 3.9 | 7.7 |  | 120.0 | 148.0 | 19.1 | 25.2 |
|  | 1,200 | 95 | 43.0 | 1.9 | 5.5 | 1,200 | 131.0 | 167.0 | 21.0 | 34.1 |
|  |  |  | 60.0 | 1.0 | 8.7 |  |  |  |  |  |
|  | 1,100 | 110 | 251.3 | 1.9 | 5.5 | 1,100 | 126.5 | 175.0 | 19.0 | 41.6 |
|  |  |  | 266.1 | 1.9 | 4.4 |  |  |  |  |  |
|  |  |  |  |  |  | 1,000 | 119.5 | 176.0 | 17.9 | 42.2 |
|  |  |  |  |  |  | R.T. | 119.5 | 195.0 | 21.4 | 35.4 |
|  |  |  |  |  |  |  | 119.0 | 194.5 | 21.5 | 34.6 |
| HTHA | 1,400 | 55 | 36.9 | 9.3 | 11.9 | 1,400 | 104.0 | 125.0 | 18.3 | 24.6 |
|  |  |  | 21.3 | 15.7 | 21.0 |  | 102.5 | 124.0 | 20.2 | 28.1 |
|  |  |  | 9.9 | 11.8 | 21.1 |  |  |  |  |  |
|  | 1,300 | 75 | 64.1 | 7.8 | 11.9 | 1,300 | 125.0 | 151.0 | 17.9 | 29.5 |
|  |  |  |  |  |  |  | 122.0 | 149.0 | 19.1 | 26.1 |
|  | 1,200 | 95 | 116.3 | 3.9 | 7.9 | 1,200 | 130.0 | 168.0 | 22.3 | 37.3 |
|  |  |  | 111.7 | 1.9 | 5.5 |  |  |  |  |  |
|  | 1,100 | 110 | 362.5 | 2.0 | 4.4 | 1,100 | 125.0 | 174.5 | 20.6 | 44.0 |
|  |  |  | 409.0 | 2.0 | 4.4 |  |  |  |  |  |
|  |  |  |  |  |  | 1,000 | 122.0 | 178.0 | 19.1 | 39.1 |
|  |  |  |  |  |  | R.T. | 122.0 | 195.0 | 20.6 | 35.4 |
|  |  |  |  |  |  |  | 122.0 | 195.0 | 21.2 | 34.0 |

Figure 16:
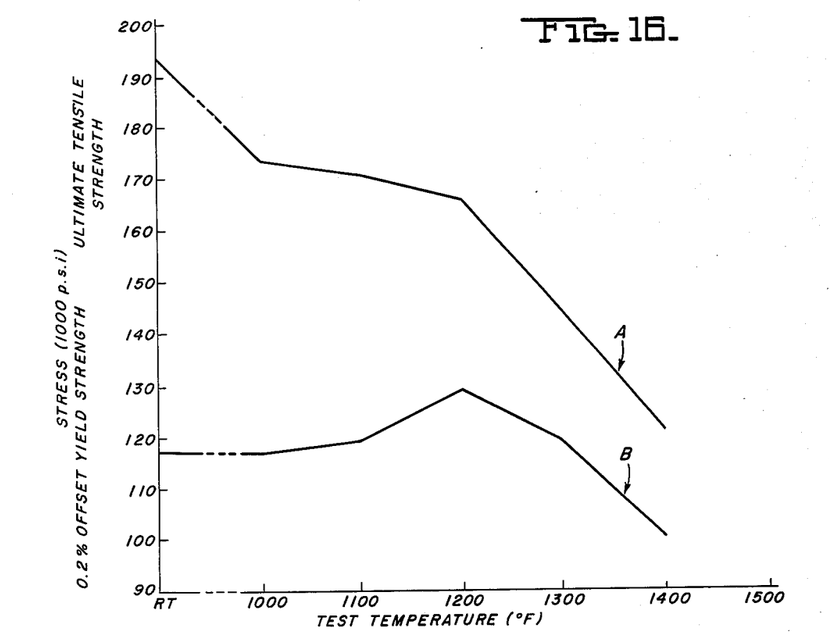
FIG. 16 is a graph relating the effect of temperature upon the tensile properties of the inventive alloys.

FIG. 16 is erected upon the data of Table X and illustrates the effect of temperature upon the ultimate tensile strength (Graph A) and the 0.2% offset yield strength (Graph B) of the alloys of Table X. From FIG. 16 it will be noted that the novel alloys retrain highly useful tensile properties at the relatively high temperature of 1400° F. It will be further noted from Graph B of FIG. 16 that the 0.2% offset yield strength of the novel alloys undergoes a substantial increase at a temperature in the neighborhood of 1200° F. Thus the 0.2% offset yield strength at 1200° F. is approximately 13,000 p.s.i. higher than that at room temperature. This phenomenon suggests the presence of an aging reaction during heating of the specimen to the test temperature. However, this increase in yield strength in the new alloys does not cause any serious embrittlement thereof after prolonged exposure at a temperature of 1200° F. Thus, further tests were conducted upon representative alloys of the invention wherein tensile test specimens, as aforesaid, were exposed to a temperature of 1200° F. for relatively extended periods of time. The results of such tests are given in Table XI.

versely affect the utility of the novel alloys for the intended applications.

Figure 17:
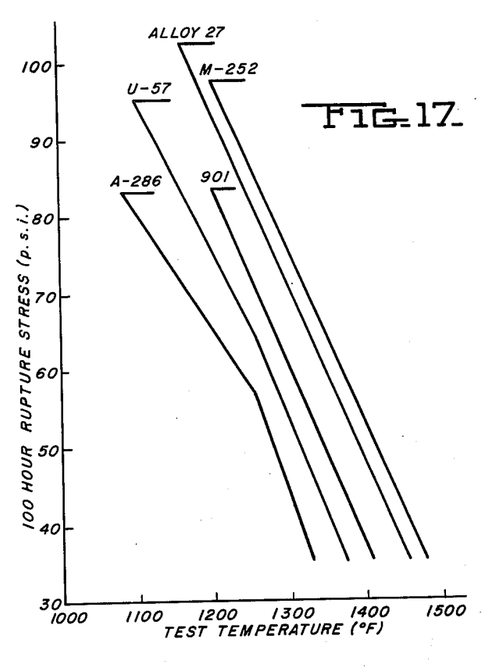
FIG. 17 is a graph illustrative of the comparative stress-rupture strengths, at various elevated temperatures, of the novel alloys and of certain prior art iron base and nickel superalloys.

The contribution to the art represented by the novel alloys is further illustrated in FIG. 17 which relates 100 hour rupture stress, at various temperatures, for a representative alloy of the invention, i.e., Experimental Alloy No. 27, and a number of prior art iron base alloys, iron-nickel alloys, and nickel base alloys. It will be seen from FIG. 17, that, prior to the present invention, a large gap existed between the iron base superalloys such as "A-286" and "V-57" and the iron-nickel base alloys such as "901" on the one hand, and the high temperature, nickel base alloys such as "M-252" on the other. From FIG. 17 it is seen that the new alloys of this invention serve the purpose of filling this previously existing large gap between these two classes of materials. Thus, the novel alloys are highly superior, vis-a-vis 100-hour stress-rupture life to the prior art iron base and iron-nickel base alloys and, indeed, approach quite closely to the performance obtainable from the presently available nickel base alloys such as "M-252."

The yield strength of the representative inventive Alloy

*Table XI.—Effect of extended-time exposure of 1200° F. on the tensile ductility of representative alloys of the invention*

| Alloy | Treatment | Room-temperature tensile properties | | | |
|---|---|---|---|---|---|
| | | 0.2% offset Y.S. (1,000 p.s.i.) | T.S. (1,000 p.s.i.) | El. (percent) | R.A. (percent) |
| LTLA | A [1] | 112.5 | 188.5 | 21.2 | 39.1 |
|  | A plus 300 hours at 1,200° F. and 20,000 p.s.i. | 129.5 | 198.0 | 17.1 | 25.0 |
| LTHA | A | 114.5 | 188.0 | 22.9 | 37.9 |
|  | A plus 300 hours at 1,200° F. and 20,000 p.s.i. | 127.5 | 194.5 | 22.1 | 33.7 |
| HTLA | A | 119.5 | 195.0 | 21.4 | 35.4 |
|  | A plus 300 hours at 1,200° F. and 20,000 p.s.i. | 136.0 | 204.0 | 17.5 | 24.2 |
| HTHA | A | 122.5 | 195.0 | 20.6 | 35.4 |
|  | A plus 300 hours at 1,200° F. and 20,000 p.s.i. | 134.5 | 202.5 | 16.7 | 24.2 |

[1] Treatment A: 1900° F. for 2 hours, air cooled, followed by 1400° F. for 16 hours, air cooled.

It will be noted from the data of Table XI that, although there is an increase in the yield strength and tensile strength and a slight decrease in percent elongation and percent reduction of the test alloys after exposure for 300 hours at 1200° F. and under a stress of 20,000 p.s.i., such property changes are not of a magnitude sufficient to adversely affect the utility of the novel alloys for the intended applications.

Figure 18:
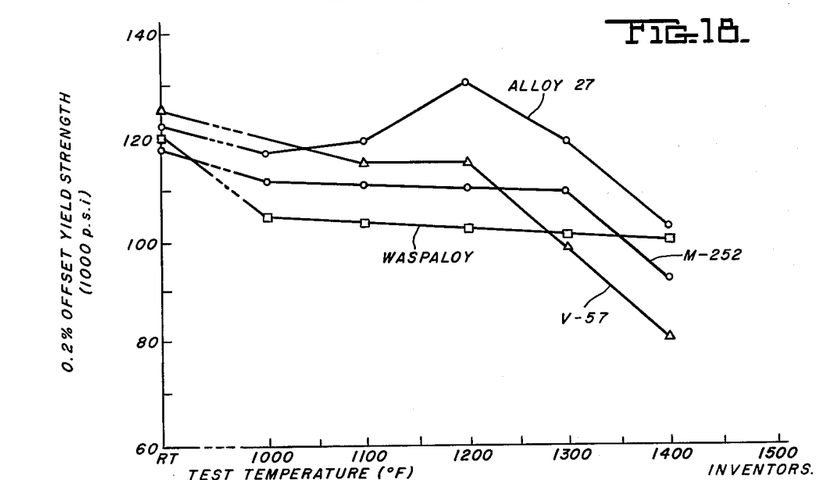
FIG. 18 is a graph showing the comparative yield strengths, at various elevated temperatures, of the novel steels and certain prior art iron base and nickel base superalloys.

No. 27 (as given in Table X and in FIG. 16) is depicted in FIG. 18, together with similar property data for the prior art iron base and nickel base superalloys "M-252." "Waspaloy" and "V-57." From FIG. 18 it will be seen that the yield strength of the new alloys is significantly greater than that of the tested prior art superalloys, both iron base and nickel base, at all temperatures over about 1050° F. up to a temperature of 1400° F. Tensile properties are equally as important as stress-rupture properties in the construction of gas turbine wheels and the new alloys, therefore, are especially useful in such applications.

As stated heretofore, a further important object of the invention is the provision of improved high temperature base alloys which are susceptible to relatively easy working. The alloys of this invention exhibit cold rolling properties substantially identical to those for type 304 stainless steel. Thus, samples of the Alloy 27 composition and samples of type 304 stainless steel were annealed at 1900° F. for twenty minutes and water quenched. Standard hardness tests of these samples showed that the Alloy 27 sample had a hardness of Rockwell "B" 85 as compared with a hardness of Rockwell "B" 80 for the type 304 stainless steel sample. These materials were then grit blasted, pickled and rolled on 3.5- and 4-inch diameter steel rolls without lubricant. The type 304 stainless steel and the Alloy 27 samples showed identical plots of roll force parameters versus roll diameter parameters, thus indicating similar rates of work hardening. It was determined that the novel alloys, illustrated by Alloy 27, are easily cold rolled to sheet form with up to 60% total reduction (10% reduction per pass) without edge cracking or surface tearing of the sheet.

A further advantage of the inventive alloys over prior art iron base superalloys is their good weldability. This factor is of great importance, for example, in the use of sheet material for the manufacture of parts for jet engine applications wherein weldability is a vital consideration. Illustrative of the utility and superiority of the novel alloys in this regard, is a test wherein a fifty-pound ingot was converted to sheet form, and the sheet then cut into weld patches. Similar weld patches were made of the prior art iron base alloy "A–286" and such specimens of both alloys were then subjected to a restrained patch weld test, as described in Welding Journal, Research Supplement "Studies on Repair Welding of Age Hardenable Nickel Base Alloys" by W. J. Lepkowski et al., September 1960, pages 392S– 400S. It was observed that the Alloy 27 specimens were readily weldable without cracking whereas the specimens of "A–286" cracked badly.

The alloys of the invention thus constitute a family of low cost, readily forgeable, weldable, iron base superalloys having greatly enhanced stress-rupture life, tensile strength and oxidation and corrosion resistance at temperatures up to 1400° F. In these respects, the new alloys are superior to known prior art iron base superalloys, being admirably suited for many high stress service applications up to temperatures 100–200° F. higher than that at which iron base alloys have previously been considered useful. These properties, coupled with the relative low cost and low density of the present iron base alloys, as compared with the nickel base alloys with which they can successfully compete, characterize the alloys of the inventions as distinct improvements in the rapidly moving, high strength, high temperature alloy field.

The heretofore described examples and specific embodiments of the invention described and shown herein are illustrative of the principles of the invention and it is to be understood that various modifications or additions may be made thereto without departing from the spirit and scope of the invention.

What is claimed is:

1. An alloy having essentially the following composition, by weight percent:

| Element: | Percent |
| --- | --- |
| Carbon | max 0.1 |
| Nickel | 34 to under 40 |
| Chromium | 12 to 15 |
| Molybdenum+tungsten (wherein molybdenum comprises at least 2%) | 4.0 to 6.5 |
| Columbium+tantalum | 0.4 to 1.5 |
| Titanium | 2.0 to 3.0 |
| Aluminum | 1.0 to 3.0 |
| Boron | Up to 0.02 |
| Cobalt | Up to 7.0 |
| Iron, balance, except for impurities. | | said alloy being characterized by enhanced stress-rupture and tensile properties and oxidation resistance at temperatures between about 1200° F. and 1400° F.

2. An alloy consisting essentially, by weight percent, of about the following composition:

| Element: | Percent |
| --- | --- |
| Carbon | max 0.1 |
| Nickel | 35 to 39 |
| Chromium | 12 to 14 |
| Molybdenum | 4.5 to 6.0 |
| Columbium + tantalum | 0.4 to 1.5 |
| Titanium | 2.3 to 3.0 |
| Aluminum | 1.2 to 2.5 |
| Boron | 0.003 to 0.02 |
| Iron, balance, exclusive of impurities. | | said alloy being characterized by enhanced stress-rupture and tensile properties and oxidation resistance at temperatures between about 1200° F. and 1400° F.

3. An alloy consisting essentially, by weight percent, of about:

| Element: | Percent |
| --- | --- |
| Carbon | max 0.08 |
| Nickel | 35 to 39 |
| Chromium | 12 to 14 |
| Molybdenum | 4.5 to 6.0 |
| Columbium + tantalum | 0.4 to 1.25 |
| Titanium | 2.3 to 3.0 |
| Aluminum | 1.2 to 2.0 |
| Boron | 0.003 to 0.02 |
| Iron, balance, except for impurities. | | said alloy being characterized by enhanced tensile properties and oxidation resistance and by a stress-rupture life of at least about 250 hours at a temperature of 1400° F. under an applied steady stress of 40,000 pounds per square inch.

4. An alloy consisting essentially, by weight percent, of about:

| Element: | Percent |
| --- | --- |
| Carbon | max 0.08 |
| Nickel | 36 to 39 |
| Chromium | 12 to under 14 |
| Molybdenum | 4.5 to 6.0 |
| Columbium + tantalum | 0.4 to 1.25 |
| Titanium | 2.3 to 2.7 |
| Aluminum | 1.2 to 1.8 |
| Boron | 0.003 to 0.015 |
| Iron, balance, except for impurities. | | said alloy being characterized by enhanced tensile properties and oxidation resistance and by a stress-rupture life of at least about 300 hours at a temperature of 1400° F. under an applied steady stress of 40,000 pounds per square inch.

5. A gas turbine wheel comprising an alloy of the composition of claim 3.

6. A gas turbine wheel comprising an alloy of the composition of claim 4.

References Cited by the Examiner

UNITED STATES PATENTS 2,816,916  8/1957  Harris et al. ________ 75—728.4
2,860,968  11/1958  Boegehold et al. ______ 75—171

DAVID L. RECK, *Primary Examiner.*

P. WEINSTEIN, *Assistant Examiner.*